W. J. McGINNISS.
PISTON RING.
APPLICATION FILED NOV. 14, 1917.

1,288,085.　　　　　　　　　　　Patented Dec. 17, 1918.

Inventor
W. J. McGINNISS
By Frederick S. ——
Attorney

UNITED STATES PATENT OFFICE.

WILLIAM J. McGINNISS, OF RICHMOND, VIRGINIA.

PISTON-RING.

1,288,085.  Specification of Letters Patent.  Patented Dec. 17, 1918.

Application filed November 14, 1917. Serial No. 201,944.

*To all whom it may concern:*

Be it known that I, WILLIAM J. MCGINNISS, a citizen of the United States, residing at Richmond, in the county of Henrico and State of Virginia, have invented certain new and useful Improvements in Piston-Rings, of which the following is a specification.

This invention relates to certain improvements in piston rings and it is an object of the invention to provide a device of this general character having novel and improved means for constantly urging the same outwardly relative to the piston so that the ring will have the requisite contact with the internal wall of the cylinder during all periods of the operation of the piston and thereby effecting a more perfect seal of the cylinder chamber for preventing the wastage of gasolene, kerosene or other liquid used for the purpose of explosion and lubrication and thus giving a maximum of power and enabling the piston to perform its function with greater efficiency.

It is also an object of the invention to provide a novel and improved piston ring of a split type and wherein the inner wall of said ring is provided with the resilient members spaced at predetermined points circumferentially of the ring and which are adapted to contact with the base of the channel in the outer wall of the piston for constantly urging the ring outwardly against the internal wall of the cylinder.

The invention consists in the details of construction and in the combination and arrangement of the several parts of my improved piston ring wherein certain important advantages are attained and the device rendered simpler, less expensive and otherwise more convenient and advantageous for use, as will be hereinafter more fully set forth.

The novel features of my invention will hereinafter be definitely claimed.

Figure 1:
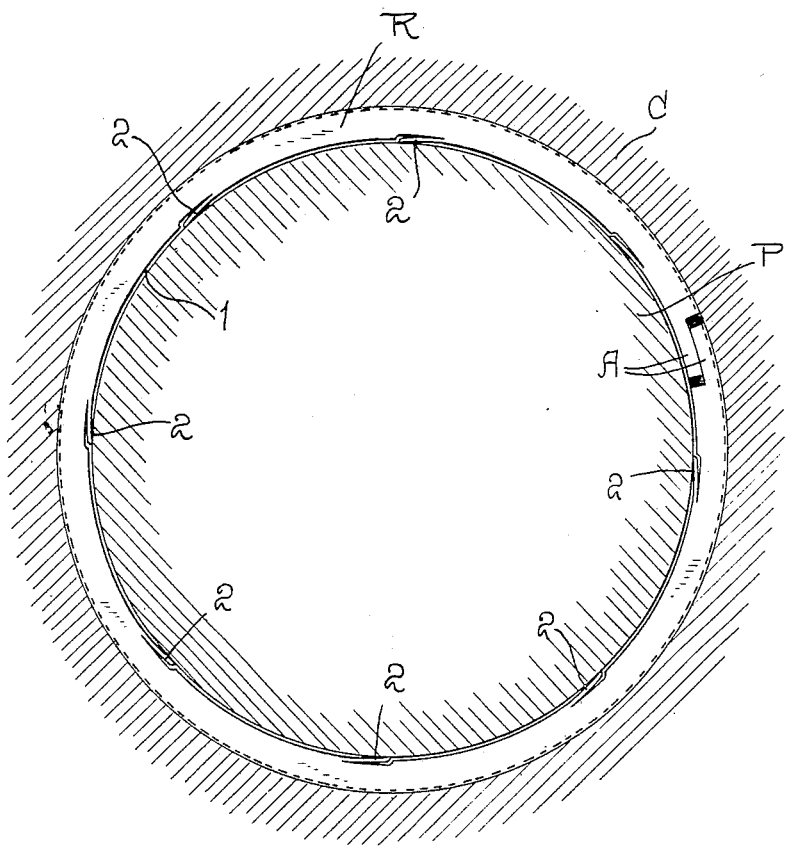
Figure 2:
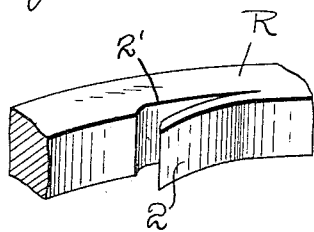

In order that my invention may be the better understood I will now proceed to describe the same with reference to the accompanying drawings wherein:

Figure 1 is a view of somewhat a diagrammatic nature illustrating a piston ring constructed in accordance with an embodiment of my invention and in applied position; and Fig. 2 is an enlarged fragmentary view in perspective of my improved piston ring illustrating in detail one of the resilient or spring members included therein.

As disclosed in the accompanying drawings P denotes a piston mounted for rectilinear movement within a cylinder C and 1 denotes an annular channel disposed around the piston P and in which is adapted to be seated my improved piston ring R. My improved ring R is of a split type and the free ends thereof are provided with a conventional interlocking joint A which may be of any character desired and if preferred may be eliminated.

At predetermined points therearound and preferably in equi-distantly spaced relation the inner wall of the ring R has struck therefrom the lips or tongues 2 possessing a certain degree of inherent resiliency and which are adapted to contact with the bottom wall of the channel 1 whereby it will be perceived that the ring R will be constantly urged outwardly so as to have requisite contact with the internal wall of the cylinder C during all periods of the operation of the piston and thereby effecting a more perfect sealing of the cylinder chamber for the purpose of stopping the wastage of gasolene, kerosene or other liquid used for the purpose of explosion or lubrication and thus giving a maximum of power and enabling the piston to perform its function with greater efficiency.

It is to be especially noted that in the formation of the piston ring embodying the improvements of my invention, the ring is formed at a plurality of points on its inner wall of surface with circumferentially extending elongated pockets or recesses 2′ and whereby the tongues 2 are produced by the metal removed to afford such pockets or recesses with an end of each of the tongues integrally connected with the body of the ring and the opposite end portion of the tongue normally extending beyond the inner wall of the ring. By this construction it will be at once self-evident that the tongues 2 may be snugly seated within the recesses or pockets 2′ when the tongues are at the outward limit of their spring movement so that a uniformly continuous and perfectly smooth inner face on the inner wall of the ring may be produced whereby it is assured that the inner wall of the ring will have effective contact with the base of the channel 1 under extreme conditions to further prevent leakage beneath the ring. It is also to be understood that the tongues 2 serve to afford a constant outward movement to the ring when in applied position independently of the inherent resiliency possessed by the ring which in itself materially facilitates the functioning of my improved ring. Furthermore, the seating of the tongues within the recesses or pockets 2' materially facilitates the functioning of the ring especially when the force of the explosion upon the piston is to one side of the axis of the piston and in which event the tongues at one side of the ring will seat within their coacting pockets or recesses to permit the maximum of expansion at the substantially diametrically opposed portion of the ring.

I claim:

1. As a new article of manufacture, a split piston ring for an internal combustion engine, the inner wall of which being provided with a plurality of circumferentially extending elongated recesses, the material removed to produce each of the recesses being connected to an end wall of said recess and having its opposite end extending beyond the inner wall of the ring to afford a spring tongue, said tongues being adapted to be pressed wholly into said recesses and thereby produce a continuously smooth and unbroken inner surface on the ring.

2. As a new article of manufacture, a split piston ring for an internal combustion engine, the inner wall of which being provided with a plurality of elongated recesses, and a spring tongue snugly fitting within each of the recesses, an end of the tongue being secured to an end wall of the recess, the opposite end portion of the tongue normally extending beyond the inner wall of the ring, said tongue being adapted to be pressed wholly into said recess and thereby produce a smooth and unbroken inner surface on the ring.

In testimony whereof I affix my signature in the presence of a witness.

WILLIAM J. McGINNISS.

Witness:
M. R. WILSON.